United States Patent
Ghoshal

(10) Patent No.: US 6,208,702 B1
(45) Date of Patent: Mar. 27, 2001

(54) HIGH FREQUENCY CLOCK SIGNAL DISTRIBUTION UTILIZING CMOS NEGATIVE IMPEDANCE TERMINATIONS

(75) Inventor: Uttam Shyamalindu Ghoshal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/012,415

(22) Filed: Jan. 23, 1998

(51) Int. Cl.[7] .............................. H04L 7/00; G01R 27/04; H03K 19/094
(52) U.S. Cl. .............................. 375/354; 324/629; 326/86
(58) Field of Search .................................. 375/354, 224, 375/225, 257, 215, 211, 213, 214, 327, 357, 362; 324/639; 333/24 R, 263; 365/233, 189.12, 190, 233.5; 326/86, 87, 88, 90

(56) References Cited

U.S. PATENT DOCUMENTS

| | | | |
|---|---|---|---|
| Re. 29,578 | * 3/1978 | Javan | 250/211 |
| 4,553,247 | * 11/1985 | Harris | 375/214 |
| 4,833,653 | * 5/1989 | Mashiko et al. | 365/203 |
| 5,280,596 | * 1/1994 | Van Berkel et al. | 395/425 |
| 5,874,845 | * 2/1999 | Hynes | 327/259 |

* cited by examiner

Primary Examiner—Chi Pham
Assistant Examiner—Khai Tran
(74) Attorney, Agent, or Firm—Casimer K. Salys; Felsman, Bradley, Vaden, Gunter & Dillon, LLP

(57) ABSTRACT

A system for synchronizing circuit operation within an integrated circuit having a high frequency clock is disclosed. The system includes an oscillator for providing a clock signal, and a clock signal complement. A two conductor transmission line is utilized to distribute the clock signal. The two conductor transmission line has a first conductor coupled to the clock signal and a second conductor coupled to the clock signal complement provides sub-circuits within the integrated circuit with a differential clock signal. Negative impedance transmission line terminations are then attached in parallel with the transmission line. The terminations boost the clock signal transition times and the clock signal complement transition times to provide high frequency circuit synchronization within the integrated circuit.

34 Claims, 3 Drawing Sheets

HIGH FREQUENCY CLOCK SIGNAL DISTRIBUTION UTILIZING CMOS NEGATIVE IMPEDANCE TERMINATIONS

BACKGROUND OF THE INVENTION

1. Technical Field

The present invention relates in general to clock signal distribution within an integrated circuit and in particular, to a differential clock signal distribution system. Still more particularly, the present invention relates to a differential clock signal distribution network utilizing negative impedance terminations.

2. Description of the Related Art

Synchronization of logic circuits within an integrated circuit is accomplished by distributing a master clock signal to each timing critical circuit. The proper operation of an information processing unit, such as a microprocessor, requires that all digital signals are in a steady state when data is clocked. In all "clocked" systems there is a master clock which controls the transfer of data.

An oscillator and a central buffer are typically utilized in an integrated circuit to produce and amplify a clock signal for distribution to digital sub-circuits. Interconnection of sub-circuits which are not adjacent on an integrated circuit substrate requires long conductors to be fabricated on the integrated circuit. Integrated circuits are becoming larger and the distance separating sub-circuits is increasing. When the distance from a driving transistor within a central buffer to a receiving transistor of a sub-circuit becomes long enough to adversely effect a signal's characteristics and propagation time, the interconnecting wire can be referred to as a "long wire".

Clock signals within integrated circuits are utilized to control the movement of data and synchronize control signals. Large designs require many different circuits to be synchronized and operate at the same speed. In such systems, a high frequency clock signal must be distributed over a large chip area. Currently, attempts to distribute clock signals in the range of one gigahertz are faltering due to the parasitic properties of long wires and long wire terminations.

A single source transistor driving many sink transistors creates a "fan-out" topology. Fanout circuits are commonly referred to as a "tree structure" or a "fanout tree". A fanout tree has detrimental loading characteristics on a propagating signal. This is particularly apparent when one "branch" of a fanout tree becomes more populated or more heavily loaded than another "branch".

The intermix of capacitance and resistance in a fanout tree creates a resistive-capacitive (R-C) time constant. A resistive capacitive time constant is a parasitic phenomena that retards the propagation of a signal and distorts the original form of the clock signal from its desired shape. A major factor in reducing propagation speed of a clock signal is the resistive effects of long wires in conjunction with the capacitance of a terminating transistor.

The resistance (R) of a wire increases linearly as a function of wire length (l) and, the resistance per unit length (r) of the material utilized, where $R=rl$. Likewise, the capacitance of a wire (C) increases linearly with its length (l) and capacitance per unit length (c). Capacitance can be defined by $C=cl$. The "R-C" delay (D) of a wire due to resistance and capacitances is $D=(\frac{1}{2})rcl^2$. As depicted by the $l^2$ term, the delay due to the capacitive and resistive effects increases quadratically with the length of a wire. As clock speeds and the scale of integrated circuits continues to increase, timing difficulties associated with wire lengths have become a vexing problem.

In designing an integrated circuit, the physical layout is accomplished in view of all the pertinent design constraints. Generally, after the layout or geographical planning of a semiconductor chip is complete, circuit synchronization problems remain. Development of faster and larger integrated circuits has created the need for effective and efficient clock distribution networks, which do not require considerable effort to attain acceptable results after layout is complete.

Computer aided design tools can suggest potential problems such as unacceptable delays, but hundreds of variables must be assimilated. Best guess estimates are then utilized to solve synchronization difficulties. The propagation delay of a signal, due to long wires and multiple sinks, can be reduced by "repowering" or relaying the signal utilizing simple amplifiers, called buffers. However, buffers introduce uncertainties in the timing of integrated circuits and require chip area. Further, the effective insertion of buffers requires expensive computer design tools. Computer design tools merely estimate solutions and provide suggestions. Buffer solutions provide a less than perfect response for a marginal design topologies.

An area of integrated circuit design which has received additional attention recently is the area of providing solutions for unacceptable delays in high frequency digital circuits. Consumer demand for faster processing and higher clock frequencies has intensified the effort to find a solution for synchronization problems associated with clock signal distribution and clock signal delays.

A typical clock distribution network has hundreds of receiving circuits which are generally referred to as terminations or sinks. Terminations are typically realized by the gate of a metallic oxide semiconducting (MOS) transistor. Although each sink or receiving transistor has a relatively small R-C time constant, the cumulative effect of many sinks create excessive delays in clock signal propagation. Currently, designers of digital circuits are striving for a clock frequency of one gigahertz and higher. Therefore, implementation of an optimum clock distribution system has become critical to minimize delays and ensure synchronization. Rapid advances in transistor technology has reduced delay problems associated with transistor switching, but the transmission lines interconnecting the transistors have become the limiting factor for implementing increased clock speeds.

Currently, circuits having large R-C time constraints require the insertion of multiple buffers into the circuit to effectively decouple the R-C load. As integrated circuits become larger and chip area becomes cheaper, high frequency operation has been the focus of integrated circuit designers. Efforts to increase the clock speeds of digital circuits have revealed the importance and need for effective integrated circuit clock distribution systems.

Attenuation of a clock signal within an integrated circuit is defined by many factors. The attenuation of a clock signal within a clock distribution network is directly proportional to the square root of number of fan-outs.

The attenuation of the clock signal is inversely proportional to the physical properties of the transmission line. The attenuation of a transmission line is defined by $$\alpha = \exp[-R/(2\sqrt{L/C})]$$

Where R is the total resistance of the transmission line from the central clock buffer to the final destination, L is the total inductance of the transmission line and C is the capacitance of the transmission line.

As the attenuation of the transmission line increases, the clock signal power level at transmission line terminations decreases. Transmission line attenuation can be very high in present systems. A sub-circuit receiving a weak clock signal can cause serious design difficulties.

Typically, a specified amount of time after the estimated receipt of the leading edge of a clock signal, data transfer is accomplished within the integrated circuit. Many prior art methods for clock distribution are plagued by distortions or delays on the rising edge of the clock signal. If the rising edge is too late, the data transfer does not occur as required.

It should therefore be apparent that it would be advantageous to provide an integrated circuit clock distribution system which distributes an acceptable clock signal at very high clock speeds and requires minimal design rectifications.

SUMMARY OF THE INVENTION

It is therefore one object of the present invention to provide an integrated circuit clock signal distribution system.

It is another object of the present invention to provide a system for distributing a differential clock signal within an integrated circuit over a two conductor transmission line.

It is yet another object of the present invention to provide a system for distributing a clock signal over a two conductor transmission line terminated by negative impedances.

The foregoing objects are achieved as is now described. A system is provided for synchronizing circuit operation within an integrated circuit having a high frequency clock. The system includes an oscillator for providing a clock signal, and a clock signal complement. A two conductor transmission line is utilized to distribute the clock signal. The two conductor transmission line has a first conductor coupled to the clock signal and a second conductor coupled to the clock signal complement. The transmission line provides sub-circuits within the integrated circuit with a differential clock signal. Negative impedance transmission line terminations are then attached in parallel to the transmission line. The negative impedance terminations boost the clock signal transition times and the clock signal complement transition times to provide high frequency circuit synchronization within the integrated circuit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
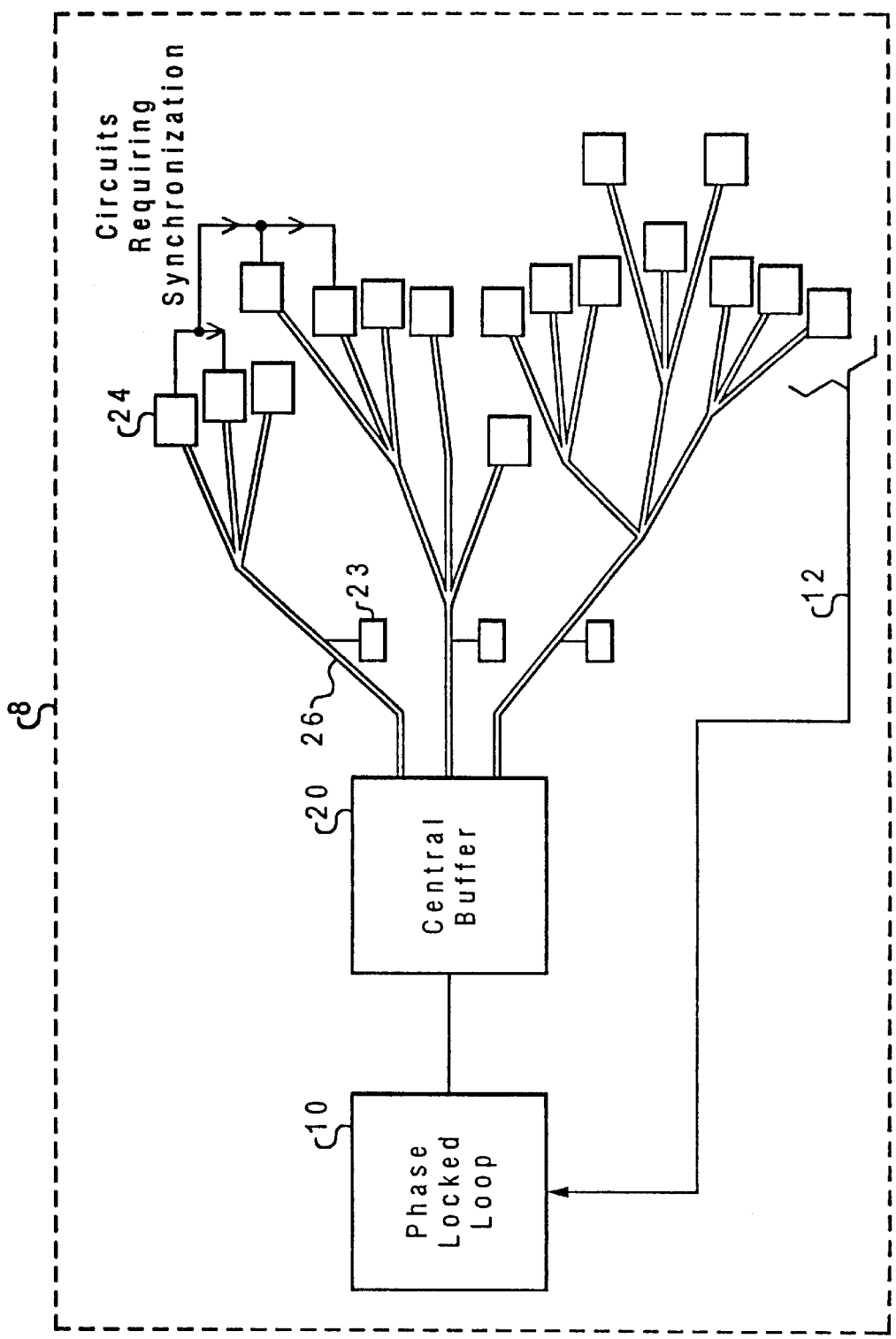
FIG. 1 illustrates a basic integrated circuit clock distribution system in accordance with the present invention.

With reference now to the figures and in particular with reference to FIG. 1, there is depicted a clock signal distribution system utilizing a two conductor differential transmission line 26. The two conductor transmission line conducts a clock signal throughout integrated circuit 8. A clock signal and a clock signal complement are distributed concurrently over differential transmission line 26.

In a preferred embodiment, the clock signal and clock signal complement are identical in form, however, the clock signal complement is shifted in phase by 180 degrees in relationship to the clock signal. A differential clock implementation guarantees low noise throughout integrated circuit 8.

The differential clock system of the present invention can compensate for clock signal attenuation by utilizing negative impedance terminations. The complement of the clock signal is utilized to trigger or incite the negative impedance on the clock signal.

Typically, a precision oscillator, such as a phase locked loop 10 is utilized within integrated circuit 8 to provide a stable clock signal for the synchronization of data transfer. Phase locked loop 10 provides central buffer 20 with a low level clock signal. The low level clock signal is amplified, conditioned and distributed by central buffer 20.

Many circuits and topologies could provide a precision clock signal for utilization in conjunction with the present invention. FIG. 1 is only one such implementation.

Within integrated circuit 8, two conductor transmission lines, such as differential transmission line 26, distribute the output of central buffer 20 to sub-circuits, such as sub-circuit 24. Sub-circuit 24 requires synchronization to properly operate in conjunction with other data circuits. Particularly, synchronization is critical when data must be transferred among sub-circuits.

Phase locked loop 10 receives feedback via sense line 12. Feedback ensures proper precision of the clock signal at the destination of the clock signal. Negative impedance elements such as negative impedance circuit 23 are coupled to differential transmission line 26 to aid in the clock signal transition speed.

In a preferred embodiment, differential transmission line 26 is a two conductor transmission line. A two conductor transmission line is a technical term utilized by those skilled in the art to define a particular transmission system topology. A two conductor transmission line consists of two parallel conductors separated by a uniform distance. The uniform separation distance of a two conductor transmission line is optimized utilizing defined parameters or properties and known physical characteristics. Pertinent physical characteristics include the conductivity of the transmission line material, the dielectric of the surrounding medium, and the frequency of the clock signal. These properties dictate an optimum separation distance of the conductors to be implemented by the transmission system. A separation of the two conductors ranging from 5 to 20 microns where each conductor has a width ranging from 10 to 30 microns and a thickness of 2 microns provides acceptable properties for the propagation of a one gigahertz clock signal.

A two conductor transmission line is a distributed parameter network. Calculations on a two line system must be described by utilizing elements which are distributed throughout the length of the system.

Figure 2:
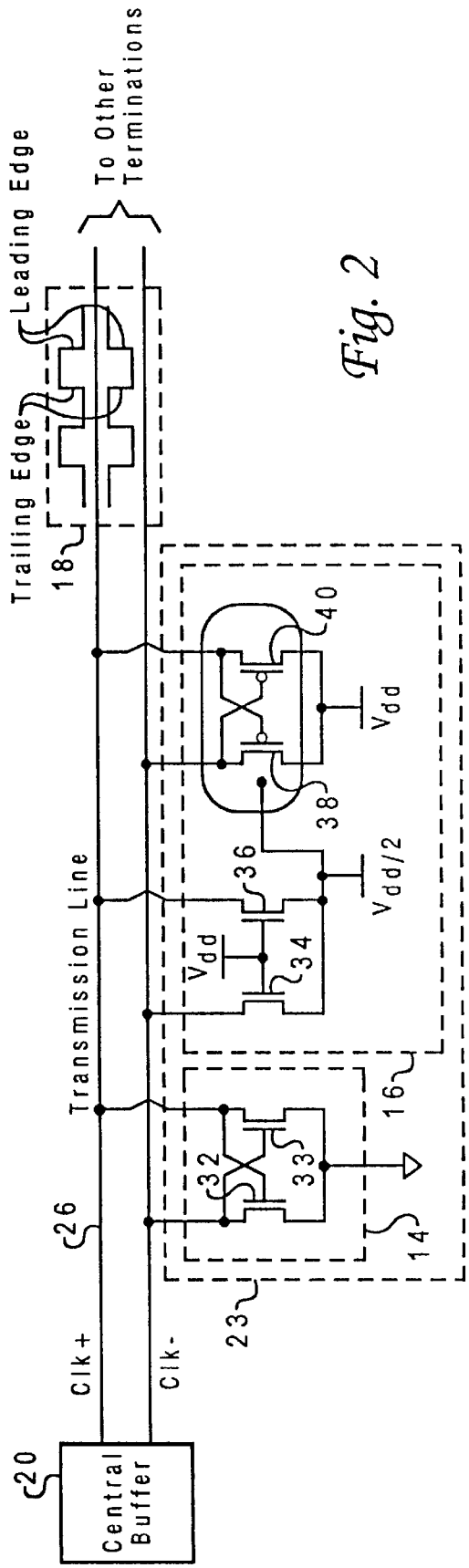
FIG. 2 depicts negative impedance terminations for a transmission line.

Referring now to FIG. 2, negative resistance circuits are depicted connected to differential transmission line 26.

Negative resistance elements are preferably distributed on the transmission line at specific intervals. Placement of negative impedance devices are determined according to clock signal attenuation calculations.

In a preferred embodiment, cross coupled N-MOS transistors alternating with cross coupled P-MOS transistors are utilized to supply the negative impedance to differential transmission line 26. Each negative impedance circuit pulls a clock signal low by sinking current in a "pull-down" mode and each negative impedance circuit pushes a clock signal high by sourcing or supplying current in a "pull-up" mode.

Negative impedance terminations are distributed throughout the clock distribution system. Therefore, the transmission characteristics of the transmission lines are different through the system. However, the attenuation of the two conductor transmission lines of the present invention is much lower than conventional systems. The velocity of propagation of the clock signal is not reduced by the negative impedance elements because negative impedance circuits are configured in parallel with the transmission line.

In FIG. 2, differential transmission line 26 is depicted coupled to pull-down circuit 14, pull-up circuit 16, and central buffer 20. Elements of FIG. 1 which are featured in FIG. 2 retain identical reference numerals. The negative impedance circuit 23 of FIG. 1 is realized by pull-up circuit 16 and pull-down circuit 14.

Pull-down circuit 14 is comprised of cross coupled transistors 32 and 33. A clock signal labeled Clk+ is coupled to the gate of transistor 32. The complement of Clk+ entitled Clk− is coupled to the gate of transistor 33. In a preferred embodiment, the Clk− waveform is inverted and shifted 180 degrees from the Clk+ waveform. The basic pulse trains of Clk+ and Clk− are depicted in dashed enclosure 18 of FIG. 2. Clk+ and Clk− together comprise a differential clock signal.

An optimal clock signal transitions from high to low rapidly and predictably. The parasitic loading on a clock signal due to transmission line resistance, capacitance and inductance slows the rise and fall time of a clock signal during transition.

Pull-down circuit 14 boosts the fall time of the trailing edge of both the Clk+ and the Clk− signal. Likewise, pull-up circuit 16 boosts the rise time of the leading edge of each signal.

In a preferred embodiment, transistors 32 and 33 are cross coupled zero threshold voltage N-type field effect transistors (FET). Transistor 32 and transistor 33 are coupled in parallel to differential transmission line 26 providing a negative impedance during clock signal transitions. During the leading edge transition of the Clk− signal, a negative impedance is applied to the Clk+ signal. The negative impedance on the Clk+ conductor is activated when the Clk− voltage rises above the threshold voltage of transistor 33. Transistor 33 turns on and provides a low impedance path to ground for the signal present on the Clk+ conductor.

During the consecutive transition of the Clk+ signal, the Clk+ signal moves from a low level to a high level. In this transition, the gate voltage of transistor 32 rises above its threshold voltage and transistor 32 turns on, pulling Clk− low. During the next transition as the Clk− signal rises, transistor 33 turns on and the voltage across transistor 33 proceeds to zero and pulls the Clk+ signal low.

The negative impedance provided by pull-down circuit 14 produces a sharp drop in the trailing edge of the clock signal and clock signal complement. A sharp or abrupt transition of the clock signal reduces the delay associated with the slow fall times common in ordinary clock distribution systems.

For transitions of the Clk+ and Clk− signals from a low level to a high level, transistors 34, 36, 38, and 40 provide a boost to the leading edge of the clock pulse. Cross coupled P-type field effect transistors 38 and 40, provide a negative impedance to positive transitioning clock signals. For example, when Clk+ is transitioning from high to low and Clk− is transitioning from low to high, transistor 40 is off and transistor 38 is on. The negative impedance to drive Clk− high during transition is triggered when the Clk+ signal voltage falls below the threshold voltage of transistor 38 and transistor 38 turns on. Transistor 38 provides voltage and current from the supply voltage $V_{dd}$ to pull up the Clk− signal.

Alternatively, when Clk− starts to transition low, transistor 40 turns on and supplies $V_{dd}$ to the Clk+ conductor. In a preferred embodiment of the present invention, zero threshold voltage transistors are utilized to implement the negative impedance elements. Fabrication of zero threshold N-MOS devices is well known to those skilled in the art. However, zero threshold P-MOS transistors are difficult to fabricate. In the present invention, transistors 34 and 36 provide a supplemental bias voltage to the P-MOS devices. The supplemental bias voltage changes the effective threshold voltage of transistors 38 and 40 to zero.

In a preferred embodiment, the P-MOS devices are fabricated in a N-well. In the present invention, the well of the P-MOS devices is supplied with the supplemental bias voltage. The threshold voltage of transistors 38 and 40 is reduced by forward biasing the back body of the transistors.

The bias technique of the present invention allows reduction of a P-MOS device threshold voltage to essentially zero without difficult fabrication processes. The present invention realizes zero threshold voltage for both N-MOS and P-MOS devices to shape the transmission line characteristics. Again, the N-MOS transistors are fabricated such that no supplemental forward bias must be applied to create a zero threshold voltage circuit. Other negative impedance devices could be utilized in combination with the present invention and other negative impedance configurations would not depart from the scope of the present invention.

The operation of the present invention is not adversely affected by fluctuations in the supply voltage. Transistors 34 and 36 provide ½ of the supply voltage as a supplemental bias to transistors 38 and 40. Transistors 34 and 36 are coupled to the differential clock signal to track or monitor clock signal levels. The voltage of the gates of transistors 38 and 40 are coupled to the supply voltage $V_{dd}$.

Negative impedance devices are unstable by nature. It is preferred that there is no memory condition or hysteresis in the transfer characteristics of the negative resistance elements. The present invention utilizes a geometric spacing between N-MOS pull-down circuit 14 and P-MOS pull-up circuit 16 to provide a time delay in circuit activation. This feature enhances the stability of the circuit and system. In a preferred embodiment, pull-up circuit 16 and pull-down circuit 14 are separated by 1 millimeter to guarantee that the circuits can not latch concurrently. The zero threshold voltage transistors of the present invention additionally ensures that the negative impedances elements can not latch.

In the present invention, a predictable delay in clock signal propagation is provided. When the Clk+ signal transitions high and the Clk− signal transitions low, the negative impedance elements switch in succession as differential negative elements are triggered.

Figure 3:
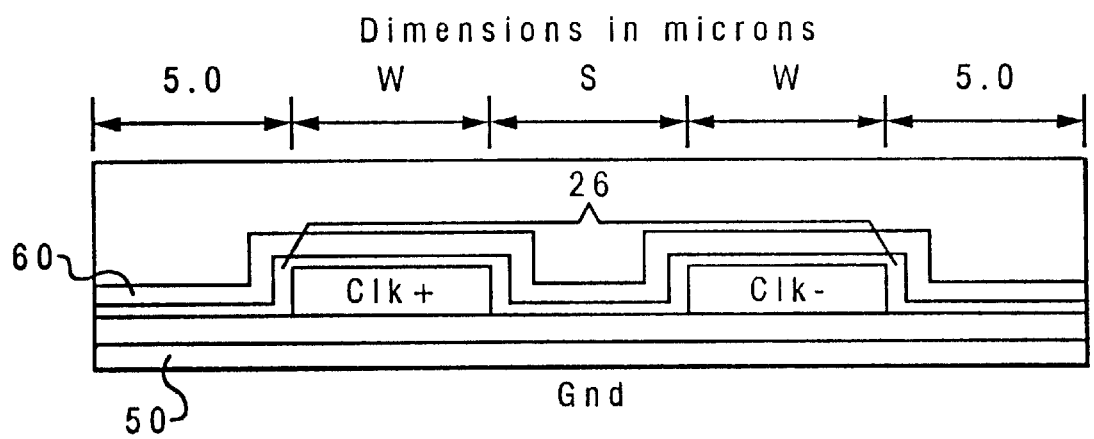
FIG. 3 illustrates a cross sectional view of an implementation of a two conductor transmission line within an integrated circuit in accordance with the present invention.

Referring to FIG. 3, a cross-sectional view of a differential transmission line fabricated into an integrated circuit is depicted. Clk+ and Clk− are separated by a distance S. The Clk+ conductor and the Clk− conductor each have a defined width W. In a preferred embodiment, a ground plane layer 50 resides below differential transmission line 26. Insulative layer 60 resides above differential transmission line 26.

The close proximity of ground plane layer 50 to differential transmission line 26 allows efficient locations for placement of transistors and provides isolation of clock generated noise from other sub-circuits. In a preferred embodiment, ground plane layer 50 and differential transmission line 26 are located in the top two layers of a multilayer (6–8 layers) interconnect system. Insulative layer 60 could be a ground plane or a power plane and not depart from the scope of the present invention.

The illustrated configuration of transmission lines ensures that propagation delays of the clock signal are independent of the geometric layout of the integrated circuit. Most importantly, differential transmission line 26 reduces coupling effects from adjacent circuits. Capacitive coupling typically occurs from transitioning signals on adjacent circuits.

Differential transmission line 26 depicted in FIG. 3 produces a multitude of enhancements over the prior art. A clock signal on a single transmission line can cause interference in adjacent circuits, or adjacent circuits can cause interference with the clock signal. The present invention greatly reduces clock signal interference problems. Additionally, differential transmission line 26 virtually eliminates supply voltage bounce and ground bounce created by large switching currents produced by ordinary buffers. Differential buffers driving differential transmission line 26 draw a constant current from the power and ground planes, and thus eliminates ground bounce problems.

The present invention utilizes a two wire transmission line configuration where clock signal delay and attenuation are independent of process variations. Process variations can change the resistive-capacitive characteristic of elements within the integrated circuit. For example, in manufacturing the inter-layer dielectric thickness typically varies. Consequently, the resistance and capacitance of fabricated elements vary from chip to chip. In the present invention, the transmission line delay is determined by the group velocity of the signal in the conductive media and not by process variations. This allows greater predictability of timing and circuit response. Additionally, the group velocity of the clock signal is independent of circuit geometry. Group velocity is determined by the speed of light in the surrounding dielectric medium.

Often, to reduce delays within integrated circuits buffers are inserted into the clock distribution network. Clock signals can be skewed as a result of process variations in fabrication of buffers. Buffers have variations in channel length which make buffers sensitive to changes in temperature and supply voltage. Buffers can contribute to random jitter and skew of a clock signal. The present invention eliminates or greatly reduces the need for buffers. Hence, the present invention virtually eliminates the temperature and voltage sensitivity commonly encountered in integrated circuits. Additionally, intense buffer insertion design efforts to compensate for process variation can be eliminated by the present invention.

Generally, clock buffers cause "di/dt" noise within an integrated circuit due to rapid changes in current flow. A differential signal buffer which generates a differential clock signal has a greatly reduced noise signature compared to conventional buffers. The noise generated in a differential signal system is several orders of magnitude less than standard topologies. A properly designed differential signal buffer creates "di/dt" currents which are nearly zero due to the cancellation effects on the power and ground planes.

In the prior art, integrated circuit clock distribution systems, as clock lines pass over other signal lines, a significant coupling of energy occurs at the intersection of the conductors in the vertical plane. The prior art is particularly susceptible to coupling phenomena when clock frequencies of over one gigahertz are utilized. The subject differential clock distribution system provides a net coupling capacitance close to zero. As the coupling current of the clock signal goes positive, the coupling current of clock signal's complement goes negative. The net coupling effect from two clock signals having opposite and equal amplitude is zero.

Clock distribution utilizing differential lines also allows negative impedance devices to be effectively utilized for boosting the rise and fall of a clock signal. In the present invention, process variations can affect the amplitude of the clock signal due to transistor threshold variations. However, the slope of the leading edge of the clock pulse or the rise time is unaffected by process variations.

In the present invention, the negative impedance devices are preferably attached in a parallel configuration to the transmission line and do not disrupt the continuity of the transmission path. Prior art systems requiring buffer insertion segments the transmission line and place buffers in series with a transmission line. Breaking the transmission path further introduces propagation delays and uncertainties. The present invention ensures a constant signal amplitude throughout the integrated circuit without utilizing series configured buffers.

Figure 4:
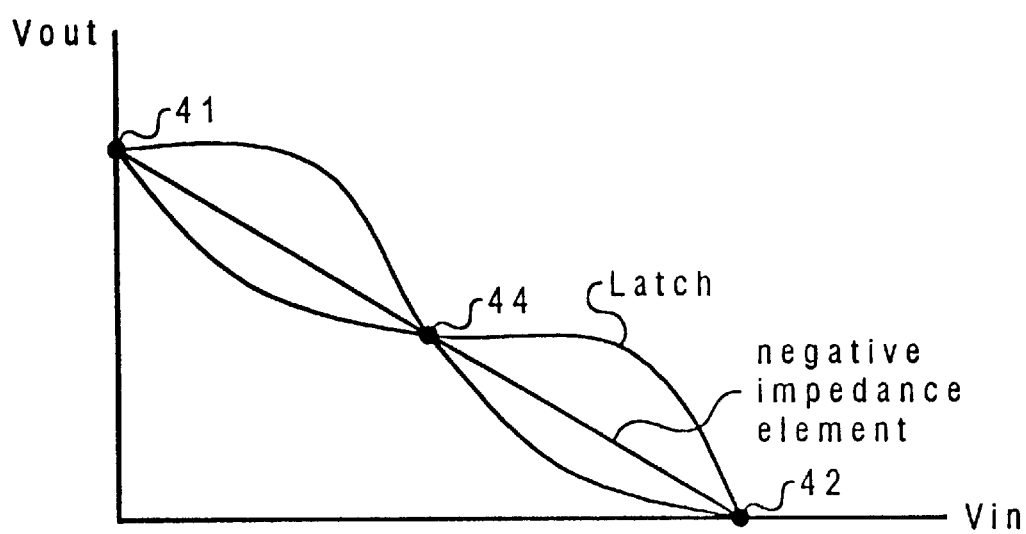
FIG. 4 depicts a graphical representation of the output of a negative impedance device in response to an input.

Referring to FIG. 4, a graph of the output voltage of the negative impedance element in response to an input voltage is depicted. The transfer characteristic of the negative impedance element is similar to the characteristics of a latch. The transfer characteristics of a complementary metal oxide semiconductor (CMOS) latch is depicted. The characteristics of a two-inverter latch has two stable operating points 41 and 42 which hold the memory values, and an unstable operating point 44. In contrast, the transfer characteristics of a negative impedance element is a straight line, as depicted in FIG. 4. The negative impedance element of the present invention has no memory capacity.

The present invention has additional applications for sine waves and digital pulses. The present invention has proven effective for low voltage circuit operation due to the utilization of zero threshold voltage devices.

A preferred embodiment of the present invention distributes a two gigahertz clock signal. The two gigahertz clock signal is divided locally by the receiving circuits to provide a one gigahertz signal to the logic circuits. Dividing the two gigahertz signal locally allows the receiving logic circuit to condition the clock signal. Although it is preferred in the present invention to utilize a two gigahertz clock, a two gigahertz clock is not essential for implementation of the present invention. A two gigahertz clock provides a duty cycles of 50 percent for receiving circuits. Therefore, the clock transition can be accelerated by local dividers.

The present invention provides optimum clock waveforms to receiving circuits. The present invention distributes a clock signal having a substantially rectangular pulse. The preferred rectangular pulse provides a high level, typically 2 volts, for 1 to 500 pico-seconds and a low level, typically ground, for 500 pico-seconds to 1 nano-second.

Assuming the clock signal becomes slightly distorted by the distribution system of the present invention, a two gigahertz clock signal allows a logic circuit to divide the clock signal locally by two and restore the clock signal to the preferred shape. Ordinary clock signal distribution systems operating at frequencies of over one gigahertz severely distort the clock shape prior to delivery to a sub-circuit.

In summary, the present invention provides a two wire clock signal transmission line system which can effectively transport signals over one gigahertz in frequency. The system provides a propagation velocity which is independent of fabrication process variations. Clock signal delays are dependent primarily on the velocity of propagation in the transmission line media. Utilizing a two conductor transmission line, the velocity of propagation is also independent of the distribution structure and substantially impervious to interference.

In the present invention the terminations or loads on the transmission lines have a negative impedance. Negative impedance terminations reduce the attenuation characteristics and boost the switching time of the signals on the transmission line.

While the invention has been particularly shown and described with reference to a preferred embodiment, it will be understood by those skilled in the art that various changes in form and detail may be made therein without departing from the spirit and scope of the invention.

What is claimed is:

1. A system for synchronizing circuit operation within an integrated circuit having a high frequency clock, said system comprising:
   a clock generator that outputs a clock signal that alternates between a high level and a low level;
   a clock inverter circuit that provides the complement of said clock signal;
   a transmission line within said integrated circuit having a first conductor and a second conductor, wherein said first conductor is coupled to said clock signal and said second conductor is coupled to said clock signal complement; and
   a plurality of terminations coupled to said first conductor and said second conductor, said plurality of terminations providing a negative impedance to said first conductor and said second conductor that boost transmission times of said clock signal and said clock signal complement.

2. The system for synchronizing circuit operation of claim 1, wherein said negative impedance terminations further comprise zero threshold voltage devices.

3. The system for synchronizing circuit operation of claim 1, wherein one or more of said negative impedance terminations comprise a pull-up circuit and a pull-down circuit.

4. The system for synchronizing circuit operation of claim 1, wherein said negative impedance terminations comprise cross-coupled N-MOS devices.

5. The system for synchronizing circuit operation of claim 1, wherein said negative impedance terminations comprise cross-coupled P-MOS devices.

6. The system for synchronizing circuit operation of claim 5, wherein said cross-coupled P-MOS devices are biased by a supplemental bias voltage.

7. The system for synchronizing circuit operation of claim 1, wherein said transmission line is a two wire transmission line.

8. The system for synchronizing circuit operation of claim 1, wherein said integrated circuit comprises at least one top layer and at least one bottom layer and wherein said transmission line is fabricated in said top layer.

9. The system for synchronizing circuit operation of claim 1, wherein a ground plane is fabricated directly under said transmission line.

10. The system for synchronizing circuit operation of claim 1, further comprising a buffer coupled to said transmission line and said oscillator.

11. The system for synchronizing circuit operation of claim 1, wherein said negative impedance terminations are coupled in parallel to said transmission line.

12. The system for synchronizing circuit operation of claim 1, wherein said clock signal complement is inverted and shifted 180 degrees from said clock signal.

13. The system for synchronizing circuit operation of claim 1, wherein said clock signal has a frequency of approximately one gigahertz.

14. The system for synchronizing circuit operation of claim 1, wherein said clock signal has a frequency of approximately two gigahertz.

15. The system for synchronizing circuit operation of claim 1, further comprising a frequency divider to divide said clock signal for utilization by said sub-circuits.

16. The system for synchronizing circuit operation of claim 1, wherein said first conductor and said second conductor are uniformly separated by a distance.

17. The system for synchronizing circuit operation of claim 1, wherein said first conductor and said second conductor have a controlled characteristic impedance.

18. An integrated circuit comprising:
    a clock generator that outputs a clock signal that alternates between a high level and a low level;
    a clock inverter circuit that provides the complement of said clock signal;
    a transmission line having a first conductor and a second conductor, wherein said first conductor is coupled to said clock signal and said second conductor is coupled to said clock signal complement; and
    a plurality of terminations coupled to said first conductor and said second conductor, said plurality of terminations providing a negative impedance to said first conductor and said second conductor that boost transmission times of said clock signal and said clock signal complement such that operation of sub-circuits connected to said transmission line is synchronized.

19. The integrated circuit of claim 18, wherein said negative impedance terminations further comprise zero threshold voltage devices.

20. The integrated circuit of claim 18, wherein one or more of said negative impedance terminations comprise a pull-up circuit and a pull-down circuit.

21. The integrated circuit of claim 18, wherein said negative impedance terminations comprise cross-coupled N-MOS devices.

22. The integrated circuit of claim 18, wherein said negative impedance terminations comprise cross-coupled P-MOS devices.

23. The integrated circuit of claim 22, wherein said cross-coupled P-MOS devices are biased by a supplemental bias voltage.

24. The integrated circuit of claim 18, wherein said transmission line is a two wire transmission line.

25. The integrated circuit of claim 18, wherein said integrated circuit comprises at least one top layer and at least one bottom layer and wherein said transmission line is fabricated in said top layer.

26. The integrated circuit of claim 18, wherein a ground plane is fabricated directly under said transmission line.

27. The integrated circuit of claim 18, further comprising a buffer coupled to said transmission line and said oscillator.

28. The integrated circuit of claim 18, wherein said negative impedance terminations are coupled in parallel to said transmission line.

29. The integrated circuit of claim 18, wherein said clock signal complement is inverted and shifted 180 degrees from said clock signal.

30. The integrated circuit of claim 18, further comprising a frequency divider to divide said clock signal for utilization by said sub-circuits.

31. A method for synchronizing circuit operation within an integrated circuit having a high frequency clock, said system comprising:

providing a clock signal having a plurality of transitions that alternates between a high level and a low level;

providing the complement of said clock signal utilizing a clock inverter circuit;

coupling said clock signal to a first conductor of a transmission line and said clock signal complement to a second conductor of said transmission line; and connecting a plurality of terminations to said first conductor and said second conductor, said plurality of terminations providing a negative impedance to said first conductor and said second conductor that boost transmission times of said clock signal and said clock signal complement such that operation of sub-circuits connected to said transmission line is synchronized.

32. The method of claim 31, further comprising the steps of pulling up and pulling down a signal transmitted on said transmission line utilizing a pull-up circuit and a pull-down circuit, respectively, of said negative impedance terminations.

33. The method of claim 31, further comprising the step of utilizing cross-coupled N-MOS devices and cross-coupled P-MOS devices within said negative impedance terminations.

34. The method of claim 33, further comprising the step of biasing said cross-coupled P-MOS devices with a supplemental bias voltage.

\* \* \* \* \*